United States Patent [19]

Prowak

[11] Patent Number: 4,949,105
[45] Date of Patent: Aug. 14, 1990

[54] PROCESS CONTROL PATCH GENERATOR

[75] Inventor: James R. Prowak, Rochester, N.Y.

[73] Assignee: Eastman Kodak Company, Rochester, N.Y.

[21] Appl. No.: 394,443

[22] Filed: Aug. 16, 1989

[51] Int. Cl.$^5$ .............................................. G01D 15/00
[52] U.S. Cl. ..................................... 346/154; 364/519
[58] Field of Search ...................... 346/150, 153, 154; 358/298; 364/518, 519, 520

[56] References Cited

U.S. PATENT DOCUMENTS

| 4,368,491 | 1/1983 | Saito | 346/298 |
| 4,684,243 | 8/1987 | Minor | 355/14 SH |
| 4,693,592 | 9/1987 | Kurpan | 355/14 E |

*Primary Examiner*—Arthur G. Evans
*Attorney, Agent, or Firm*—J. R. Hanway

[57] ABSTRACT

Method and apparatus for generating a process control patch on a charge-retaining member in a photocopier or printer. Patch data is stored in binary form for a small portion of the first two lines of the patch. This data is replicated throughout the patch to provide the pixel data for the entire patch. Blank pixel data is sent to the printhead during portions of line scans which do not contain the control patch.

19 Claims, 2 Drawing Sheets

PROCESS CONTROL PATCH GENERATOR

BACKGROUND OF THE INVENTION

1. Field of the Invention

This invention relates, in general, to photocopying and, more specifically, to process control of charging, exposure, and developing apparatus in photocopiers and like devices.

2. Description of the Prior Art

Photocopiers, electrophotographic printers, and like devices, all need the ability to maintain proper control over the image producing apparatus to assure high quality, hardcopy outputs. One means for controlling a variety of parameters within the apparatus is using a density or process control patch positioned on the photosensitive or charge-retaining member of the apparatus. The control patch is usually a small area located on the photosensitive member outside the region or frame allocated for the normal image information which will be transferred to the hard copy output medium. The control patch is developed by toner application, and reflected light from the developed patch gives an indication of the density of the developed image and allows for changes in the operating parameters to improve the image quality. The toner concentration, the charge on the photosensitive member, and the amount of exposure from the printhead or exposing device, are all parameters which can be changed according to the information received from the circuitry which looks at the amount of light reflected from the control patch.

In optical copiers which create the image on the photosensitive member directly from the original document through a set of lenses, the process control patch is usually created by localized control of the light source, using a fixed spot or "original" patch located near the area where the original document is placed, or by others methods, such as localized charge control on the photosensitive member. Electronic copiers offer new and different methods for creating the control patch on the photosensitive member. In electronic copiers, the image to be created on the photosensitive member is defined by a modulated light beam which moves across the surface of the photosensitive member. Laser scanners and light emitting diode (LED) array printheads are two examples of writing devices for electronic copiers and printers. In such apparatus, the control patch is usually created by sending a known pattern of data to control the modulation of the light-emitting elements in the writing head. In the case of an LED printhead array which uses a line of LED's across the whole page, the data is driven into the LED printhead in a serial fashion for the complete line. Once a line of data has been loaded, the printhead LED's are turned on or off, depending upon the characteristics of the data loaded therein.

Process control patches are usually small compared to the overall frame or image area on the photosensitive member. A control patch one-quarter inch square can provide the necessary area to reflect light for the process control measurements. However, since the data loaded into the LED printhead forms a whole line across the photosensitive member, the conventional way of printing a process control patch requires much more memory than actually needed. A one-fourth inch square process control patch positioned on a photosensitive member with a resolution of 400 dpi (dots per inch) contains only 10,000 pixels. Assuming a binary system where each pixel is either on or off, 10,000 bits of memory is needed to store the pixel information for this control patch. However, because conventional practice loads the whole line for the printhead, 480K bits are actually needed in the memory storage to represent the control patch, assuming the printhead is 12 inches long. Providing such a large amount of memory according to the prior art to produce such a small patch area makes for inefficient use of memory space and, just as important, makes it much more difficult to integrate the printhead driver electronics onto an ASIC (Application Specific Integrated Circuit). Therefore, it is desirable, and it is an object of this invention, to provide circuitry for generating a process control patch which does not require the large amount of memory used by circuitry constructed according to conventional practices.

Typically, process control patches are created at the highest contrast or density level, that is, with all of the pixels in the patch completely black. While this is sufficient in many cases to provide the information needed to control the variables of the process, sophisticated control algorithms and monitoring circuitry is becoming available which can make better use of the control patch when it is printed at some level between the lightest and the darkest shades or density available. In order to vary the density of the control patch according to the prior art, it has been necessary to change the memory which has been dedicated to the data for creating the patch. As previously stated, this memory can be considerable in size and, therefore, changing the density of the control patch is a significant undertaking and may require an appreciable amount of reprogramming and data transfer. Therefore, it is desirable, and it is another object of this invention, to provide a process control patch generator which can easily be changed to create control patches having different densities.

Another problem associated with conventional control patch generators involves the placement of the patch on the photosensitive member. Rearranging or moving the location of the patch, or changing the physical size of the patch, according to the prior art, requires major reprogramming and data changes similar to the changes needed for changing the density of the patch, as previously stated. The large memory which is needed, according to the prior art, to provide the small density control patch, requires inefficient use of memory and restricts circuitry design, placement, and changes. Therefore, it is desirable, and it is still a further object of this invention, to provide a control patch generator which can easily be changed to alter the size and location of the control patch on the photosensitive member.

SUMMARY OF THE INVENTION

There is disclosed herein a new and useful system for generating data to produce a process control patch on a charge-retaining member of a photocopier or printer. According to a specific embodiment of the invention, the circuitry contains two one-byte registers which contain data for a small portion of the process control patch. One register contains data for a small portion of the first line of the patch, and the other register contains data for a small portion of the second line of the control patch. This data is sent to the printhead at the appropriate time under the control of other components of the circuitry to print or write the process control patch. The data is alternated between the two registers by a line counter so that every other line in the control patch is derived from data from the same register.

A pixel counter is used in the circuitry to determine the position of the output data relative to the position of the scan line across the charge-retaining member. By comparative means, the pixel counter enables the output of the patch data from the registers during the pixel positions in the scan lines where the patch is to be written. During other portions of the scan line, the register data is inhibited and blank pixel data is effectively outputted to the printhead.

By using the system of this invention, only a small amount of memory is needed to store the entire pixel data for the complete patch. This memory is easy to change and download from associated processors. Therefore, changing the data and changing the density level of the patch is easily accomplished. The position and size of the patch can also be changed easily by modifying the address registers within the patch control circuitry. Because of the small memory requirements and minimal amount of control circuitry, the circuitry can easily be implemented on an ASIC.

BRIEF DESCRIPTION OF THE DRAWINGS

Further advantages and uses of this invention will become more apparent when considered in view of the following detailed description and drawings, in which.

DESCRIPTION OF THE PREFERRED EMBODIMENTS

Figure 1:
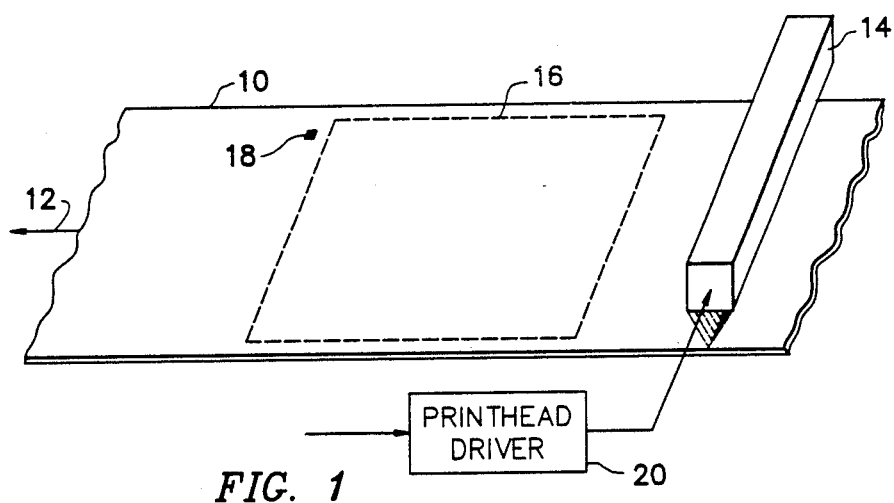
FIG. 1 is a diagram illustrating the relative physical positions of important components in the system of this invention.

Throughout the following description, similar reference characters refer to similar elements or members in all of the figures of the drawings.

Referring now to the drawings, and to FIG. 1 in particular, there is shown a diagram illustrating the relative locations of the items used by the invention. The photosensitive member 10 moves in direction 12 with respect to the printhead 14. The photosensitive member 10 is of the charge-retaining type wherein the latent images thereon are created by controlling the amount of charge on the member 10, either by placing a charge directly on the member or reducing a charge at specific locations by suitable devices or light exposure. In any event, the latent image is developed with toner at a development station which is not shown in FIG. 1. The area 16 represents the area on the member 10 which is allocated or designed to contain the actual image to be transferred to the hardcopy output medium, such as a sheet of paper or transparency. Outside of the area 16 is a process control patch 18 which, for illustrative purposes, is shown as already being developed by toner. Both the image area 16 and the control patch 18 in this specific embodiment were formed from latent images created on the member 1 by selective control of light-emitting diodes in the printhead 14. The control of the individual diodes is provided by the printhead driver 20 which is described in more detail later herein.

Figure 2:
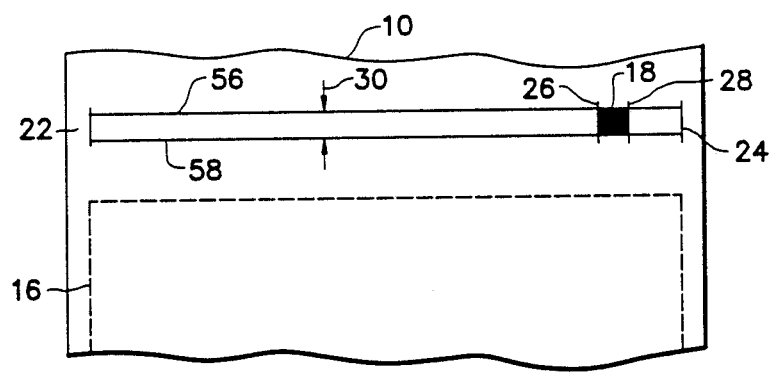
FIG. 2 is a diagram illustrating the position of the process control patch on the photosensitive member.

FIG. 2 is a diagram illustrating the position of the process control patch 18 on the photosensitive member 10. Lines are "scanned" across the photosensitive member 10 between positions 22 and 24, as shown in FIG. 2. With a stationary LED printhead, the complete line is "scanned" at the same time since the LED's extend across the member 10. Although the lines extend completely across the working image area of the photosensitive member 10, the process control patch 18 only occupies the area between the positions 26 and 28. Assuming, for this specific embodiment, that the lines are written with a resolution of 400 lines per inch, there would be 100 lines in the region 30. These 100 lines would be needed to contain the patch 18, assuming a one-fourth inch square patch. The circuitry of this invention can conveniently and easily vary the size of the patch, the location of the patch along the "scan" lines, and the density of the printed patch. The patch 18 shown in FIG. 2 is of maximum density wherein all of the pixels within the control patch 18 are turned on and printed in black.

Figure 3:
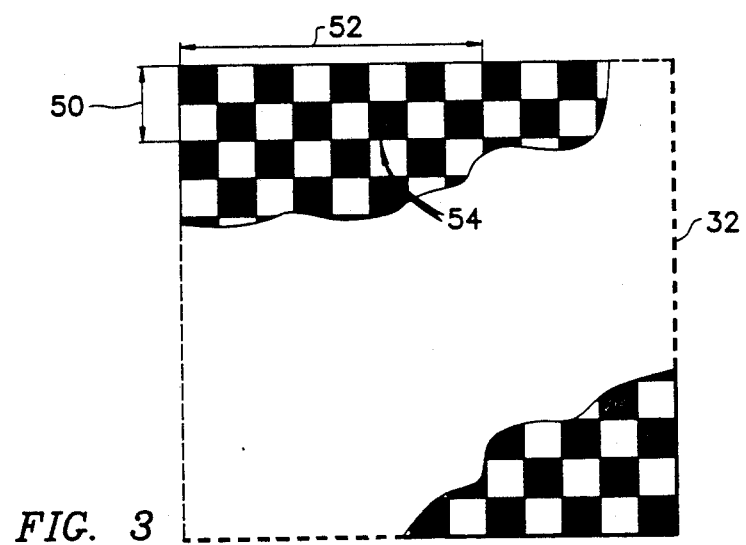
FIG. 3 is a partial, enlarged view of the process control patch showing a particular pixel pattern.

FIG. 3 is a partial, enlarged view of a process control patch showing a particular pixel pattern. The patch 32 is similar to the patch 18 except that the density of the patch 32 is less than that of the patch 18 shown in FIG. 2. Patch 32 has a density approximately half way between the minimum and maximum possible, since only half of the pixels defining the patch 32 are printed in black. In a binary representation of the pixels shown in patch 32, a single bit would be needed to describe each of the pixels in the patch. The particular pattern shown in FIG. 3 is produced when every other bit in the memory is of the same binary value. For purposes of illustration, the printed or black pixels are represented by a binary "1", and the blank or non-printed pixels are represented by a binary "0". Assuming the reflected light from the patch 32 is confined within the boundaries of the patch, the intensity of the reflected light from the patch 32 is approximately one-half of the intensity of the light reflected from a patch of similar size which has all of the pixels blank. The reflected light is used to control the various operating parameters of the photocopying device.

Figure 4:
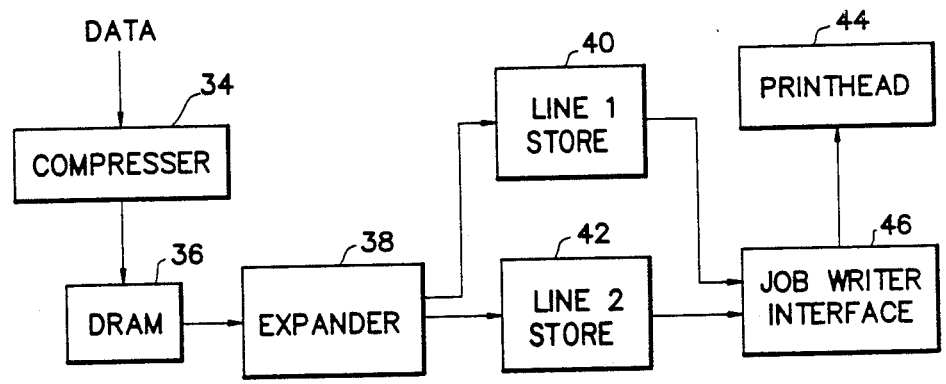
FIG. 4 is a block diagram showing the general functional locations of the major printhead control components.

FIG. 4 is a block diagram showing the general functional locations of the major printhead control components. The data used to construct the actual image in the apparatus is applied to the compresser 34 which reduces the memory storage requirement for the data by compressing the data and storing this data in the memory, or DRAM, 36. At the appropriate time, and under the control of a suitable processor, the data in the memory 36 is applied to the expander 38 which expands the data into the form needed by the printhead and applies the expanded data to the line stores 40 and 42. Two line stores are used in this embodiment since the diodes of the LED printhead 44 are loaded in parallel. While one line store is being filled by the expander 38, the other line store is being unloaded into the printhead by the job writer interface (JWI) 46. When both operations are completed, they are alternated by the JWI and the process is repeated. In addition to the job writer interface 46 handling the task of sending the image data from the line stores 40 and 42 to the printhead 44, it also performs the function of creating the data necessary for producing or writing the process control patch. The job writer interface 46 also controls other printhead related functions, such as the location of the image, the level of the LED's in the printhead needed to produce the desired image, and other functions directly associated with the printhead 44. The job image buffer (JIB) shown generally in FIG. 4 controls the overall data flow of the image data to the printhead as well as the printhead control and process control patch generation functions.

Figure 5:
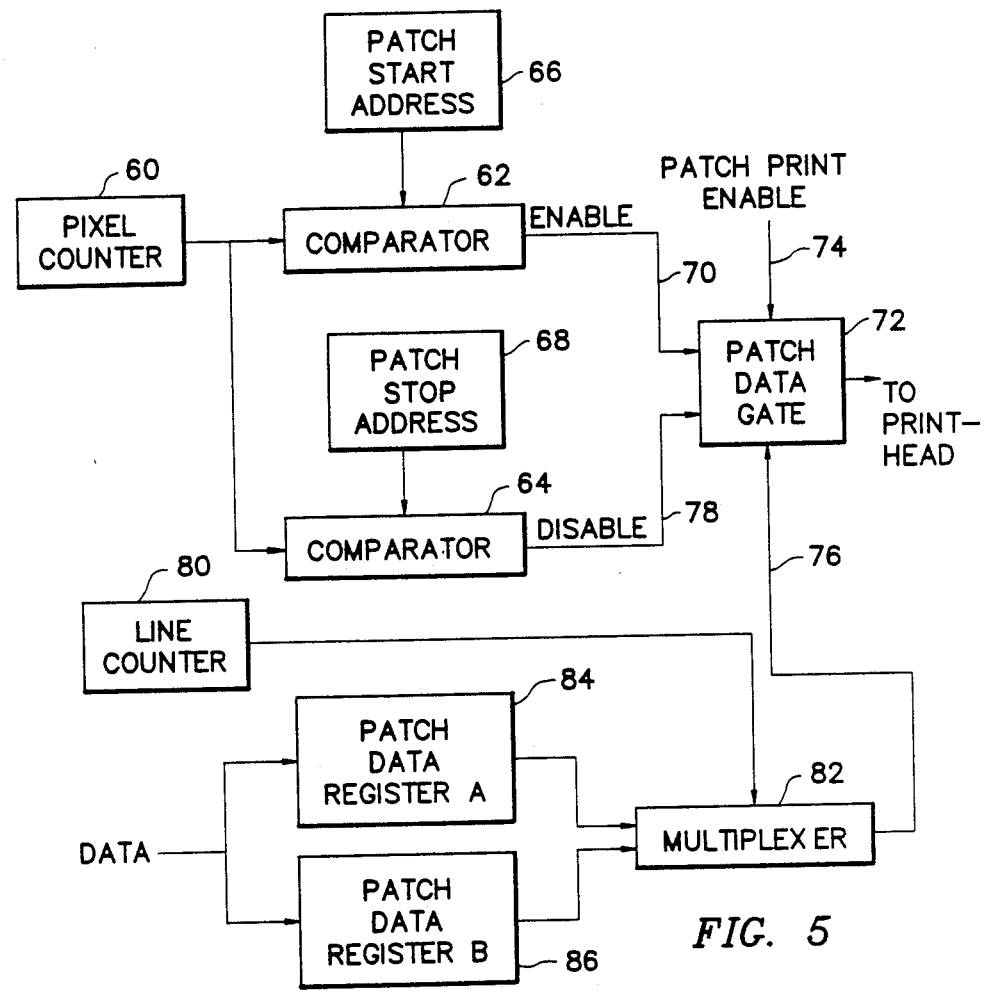
FIG. 5 is a block diagram illustrating circuitry for a patch generator constructed according to a specific embodiment of this invention.

FIG. 5 is a block diagram illustrating circuitry for a patch generator constructed according to a specific embodiment of this invention. The circuitry in FIG. 5 provides the process control patch generation function of the job writer interface (JWI) 46 shown in FIG. 4. The circuitry of FIG. 5 uses a small amount of data to reconstruct the entire control patch in a specific location of the scan line. With reference to FIG. 3, the specific embodiment of this invention uses a 16-pixel block to define all of the pixels in the patch 32, with the 16 pixels being located within the rectangle having side dimensions 50 and 52. These 16 pixels are repeated throughout the entire patch 32 to produce the overall patch pattern.

It should be evident that changing the data for the 16 pixels in the 16-pixel area 54 changes the pixels in the remainder of the patch 32. Since anywhere between 0 and 16 pixels can be printed in black, the overall patch 32 will have a density range of 16 levels. This is all accomplished by 16 pixels and, in the case of binary pixel representation, only 16 bits, or two eight-bit bytes, are needed for memory storage. Of course, many other combinations of binary pixels to form a portion of the total desired patch may be used within the contemplation of this invention. For example, 12 pixels all on the same line, or four pixels for three different lines, may be used. In any event, only a relatively small number of lines and pixels per line are stored and used to create the entire patch area compared to the number of lines and pixels actually contained in the patch.

According to FIG. 2, the circuitry of this invention sends out binary "0's", or blank pixel data, beginning at position 22 and ending at position 26, assuming that the data loaded into the printhead is sequenced from left to right in FIG. 2. Between position 26 and 28, for each of the scanned lines, the data for the control patch is sent out to the printhead based upon the data in two bytes, or 16 bits, of the control circuitry. Data for blank pixels is also sent to the printhead for the line scans between positions 28 and 24. The circuitry of this invention also controls the beginning of scanning and patch output data at the beginning line 56 and ends the data transfer at the ending line 58.

FIG. 5 will be described in connection with occasional referrals to FIGS. 2 and 3. According to FIG. 5, the pixel counter 60 provides a count as a binary number which is representative of the position of a pixel along the scan line. The value in the pixel counter 60 is applied to the comparators 62 and 64. Patch start address 66, which can be a binary quantity, is also applied to the comparator 62. Similarly, the patch stop address, which can also be a binary number, is applied to the comparator 64. When the pixel counter 60 is equal to the patch start address 66, the comparator 62 activates the enable line 70 to the patch data gate 72, which has already been enabled by the patch print master enable line 74. Line 74 is active during the time the patch is to be produced. Enabling patch data gate 72 with line 70 allows data from line 76 to be outputted to the printhead. When the pixel counter 60 produces a count which is equal to the patch stop address 68, the comparator 64 activates the disable line 78 which prevents data transfer from the line 76 to the printhead.

During the times when the patch data gate 72 is disabled, binary "0's" or blank pixels are outputted to the printhead by the state of the patch data gate output line. The patch data gate 72 is enabled only between positions 26 and 28, as shown in FIG. 2. During those positions, actual data for the patch is outputted to the printhead. Otherwise, "0's" or blank pixel data is outputted to the printhead between positions 22 and 26, and between positions 28 and 24. By using this structure, data for the portions of the scan lines which does not include the patch 18 is provided without the need to have the data stored in memory.

Referring again to FIG. 5, a line counter 80 is connected to a multiplexer 82. The line counter 80 issues a signal for every odd line to be scanned or written by the printhead. The multiplexer 82 responds to the presence or absence of this signal and selects data from either patch data register A (84) or patch data register B (86). Registers 84 and 86 receive their pixel data in binary form as downloaded data from the system processor associated with the overall job image buffer controller. Data in registers 84 and 86, in this specific embodiment, defines the 16-pixel area 54 shown in FIG. 3. The first eight bits in the first line of the patch 32 are stored in register 84, and the first eight bits in the second line of the patch 32 are stored in register 86. It is within the contemplation of this invention that more or less than eight bits per register may be stored for replication in the overall patch, and more than two lines of data may be stored in two or more registers.

Since the data for the entire patch is stored in two eight-bit registers, a considerable reduction in memory is achieved by the present invention compared to the memory required by prior art techniques. This permits the implementation of the control patch circuitry on an ASIC. In addition, changing the density of the process control patch simply involves changing the data in the two registers 84 and 86 of FIG. 5. This data can be downloaded from the processor controlling the overall printhead functions and provides a simple manner in which the density of the control patch can be altered. Changing the size and placement of the process control patch is also easily accomplished by this invention without the need to change a large amount of memory. According to FIG. 5, the position and size of the control patch across the scan line is governed by the addresses in the address registers 66 and 68, which address data can also be downloaded from the associated processor. Timing on the enabling line 74 can govern the size and position of the control patch with respect to the line position of the patch on the photosensitive member.

It is emphasized that numerous changes may be made in the above-described system without departing from the teachings of the invention. It is intended that all of the matter contained in the foregoing description, or shown in the accompanying drawings, shall be interpreted as illustrative rather than limiting.

I claim as my invention:

1. A system for generating a process control patch on a charge-retaining member of a hardcopy output device having means for developing said patch, said system comprising:

memory means for storing pixel data for a small portion of the pixels in the patch;

writing means for selectively altering the charge-retaining member in response to input data; and means for repeatedly outputting said pixel data to said writing means a plurality of times to provide the data for the complete patch.

2. The patch generating system of claim 1 wherein the memory means stores data for only a small number of pixels in a small number of lines of the patch.

3. The patch generating system of claim 1 wherein the memory means stores data for only two lines of the patch.

4. The patch generating system of claim 1 wherein the memory means stores data for only eight pixels in each of the first two lines of the patch.

5. The patch generating system of claim 1 wherein the pixel data is stored in one-bit binary form with each pixel being either completely on or off.

6. The patch generating system of claim 1 wherein the outputting means supplies data for complete lines to be written on the charge-retaining member.

7. The patch generating system of claim 6 wherein the stored patch data is only supplied by the outputting means for a small portion of the lines.

8. The patch generating system of claim 7 wherein the outputting means supplies data which indicates blank pixels for the portions of the lines not containing the patch data.

9. The patch generating system of claim 6 wherein the outputting means also includes:
    means for counting the number of pixels represented by the line output data;
    means for outputting blank pixel data for each line containing the patch until said counting means reaches a first address;
    means for outputting the patch data for each line after the first address has been counted and before a second address has been counted; and
    means for outputting blank pixel data for each line to the completion of the line after the second address has been counted.

10. The patch generating system of claim 9 wherein the blank pixel data for the lines is generated by maintaining a predetermined output state from the outputting means when the stored patch pixel data is not being outputted.

11. A method for generating a process control patch on a charge-retaining member of a hardcopy output device having means for developing said patch, said method including the steps of:
    storing pixel data for only a small portion of the pixels in the patch;
    outputting said data repeatedly to provide data for the complete patch; and
    writing the repeatedly outputted data on the charge-retaining member to form the complete patch.

12. The method for generating a process control patch of claim 11 wherein the pixel data is in binary form for specifying a pixel either as completely printed or blank.

13. The method for generating a process control patch of claim 11 including the step of transferring, from another system, the pixel data to be stored.

14. The method for generating a process control patch of claim 13 wherein the pixel data is stored in at least one register of the system.

15. The method for generating a process control patch of claim 14 wherein the density of the patch is determined by the density of the pixel data stored.

16. Circuitry for generating a process control patch on a charge-retaining member of a hardcopy output device having means for developing said patch, said circuitry comprising:
    means for writing pixel data onto the charge-retaining member in response to lines of pixel data;
    means for counting pixels and lines;
    means for comparing location addresses of the patch with the pixel and line counts;
    first and second registers loaded with pixel data for the patch; and
    controllable gate circuitry for controlling the flow of pixel data from the registers to the writing means;
    said comparing means activating the controllable gate for flow of data from the registers when the pixel counter is between start and stop addresses for the patch, and deactivating the controllable gate when the pixel counter is not between start and stop addresses to cause the writing means to only obtain data indicating blank pixels when the gate is deactivated.

17. The patch generating circuitry of claim 16 wherein the data is stored in pixel form in two registers from data downloaded from another system.

18. The patch generating circuitry of claim 17 wherein the data in the two registers is stored in binary form with both binary states existing in the stored data.

19. The patch generating circuitry of claim 17 wherein the circuitry also includes a line counter which alternates the flow of data between the two registers.

* * * * *